United States Patent [19]

Fleischer et al.

[11] 3,900,880

[45] Aug. 19, 1975

[54] WIRELESS REMOTE OPERATION OF AN RF RECEIVER

[75] Inventors: Wolfgang Fleischer; Kurt Knuth, both of Hannover, Germany

[73] Assignee: Licentia Patent-Verwaltungs-G.m.b.H., Frankfurt am Main, Germany

[22] Filed: Dec. 5, 1973

[21] Appl. No.: 421,993

[30] Foreign Application Priority Data

Dec. 6, 1972 Germany ............................ 2259562

[52] U.S. Cl. .................................. 343/228; 343/225

[51] Int. Cl. .............................................. H04b 1/06

[58] Field of Search ..................... 343/228; 325/392; 178/DIG. 15; 340/171 R, 168 R

[56] References Cited

UNITED STATES PATENTS 3,678,392 7/1972 Houghton ........................... 325/392

*Primary Examiner*—Harold I. Pitts

*Attorney, Agent, or Firm*—Spencer & Kaye

[57] ABSTRACT

For the wireless remote control of an RF receiver having a remote control signal processing portion, the RF receiver being capable of being switched between an off state, an on state and an enabled state in which a channel is not being received but the remote control signal processing portion is operative, the remote control processing portion includes a remote control signal receiver unit and a memory circuit connected to receive signals from the receiver unit and to convert them into voltages which operate the RF receiver, and there is provided a remote control signal transmitter having a button or key for each channel and arranged to transmit, upon actuation of a given button, a carrier signal which is pulse modulated with a number of pulses corresponding to the selected channel. The memory circuit has one location for each such channel and an additional location which can produce an output voltage to switch the receiver from its on state to its enabled state. Only one memory location can produce an output voltage at any given time.

10 Claims, 1 Drawing Figure

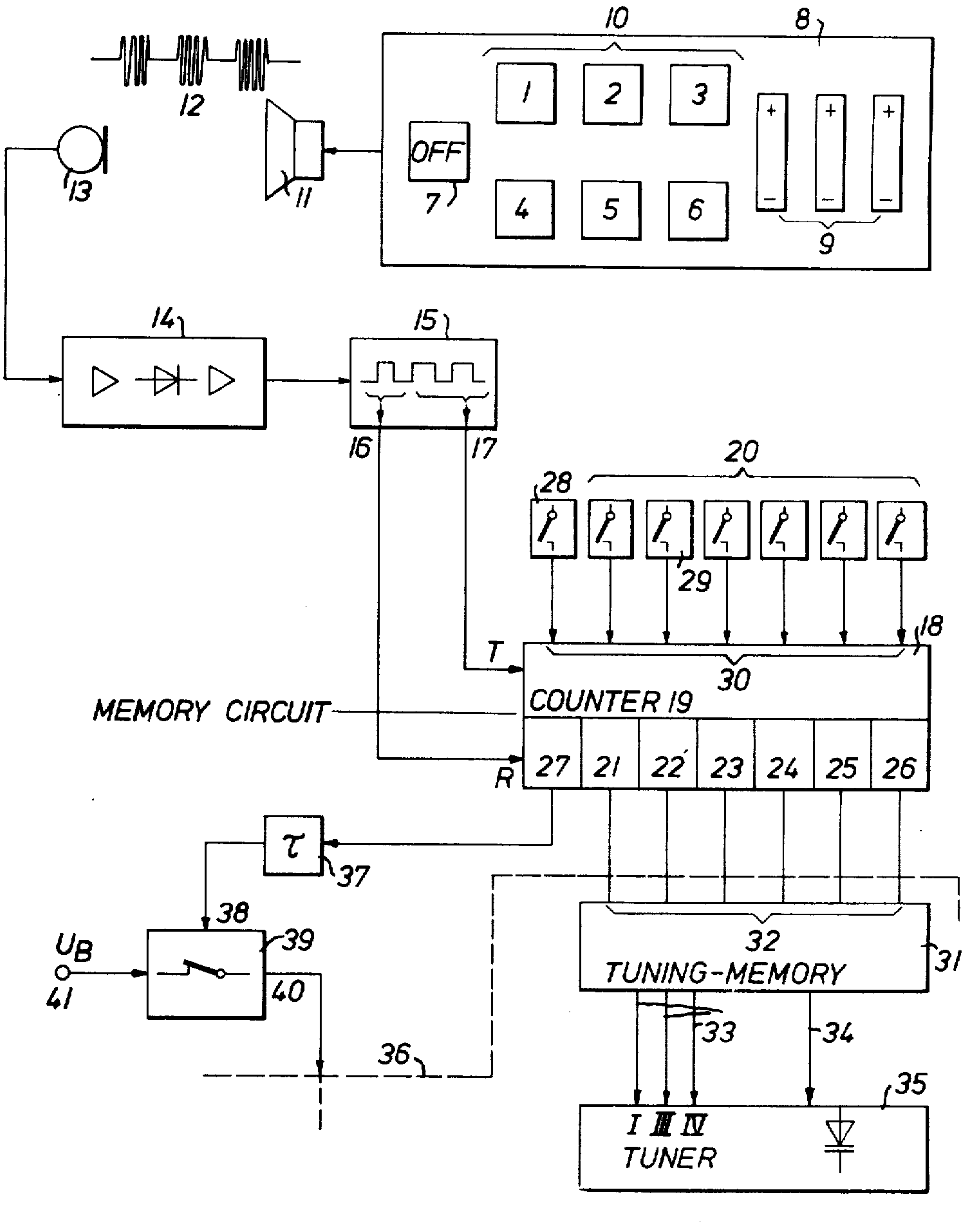
10
8
1
2
3
OFF
7
4
5
6
9
12
13
11
14
15
16
17
20
28
29
18
30
T
MEMORY CIRCUIT
COUNTER 19
R
27
21
22
23
24
25
26
37
38
39
$U_B$
41
40
32
TUNING-MEMORY
31
33
34
36
35
I III IV
TUNER

WIRELESS REMOTE OPERATION OF AN RF RECEIVER

BACKGROUND OF THE INVENTION

The present invention relates to a system for the wireless remote operation of an RF receiver which can be switched in and out of its operational state and into a third enabled state.

In such a system, a switch unit is provided at the remote control transmitting apparatus to switch the receiver from the enabled to the operating state via remote control devices, the switch unit simultaneously serving as a station or channel selector switch and being operative to actuate a switching memory in the RF receiver. The output voltage from the memory effects the above-mentioned switching of the RF receiver.

There exist known devices for the wireless remote operation of a television receiver, which transmit a signal capable of switching the channel being received, as well as changing the setting parameters, such as volume, brightness, contrast, etc. The remote control transmitter is also often provided with a further key or button to switch off the television receiver.

In order to be able to remotely control the television receiver by means of such a remote control device, it is necessary to first switch on the television receiver at the set itself. Only then is it possible for the television receiver to receive a remote control signal via appropriate receiving circuit and to process it. Switching on of the television receiver by means of the above-described remote control device, i.e. from the transmitter portion of the remote control device, is not possible with such a unit.

A known remote control device for a television receiver, such as described in the periodical "*Grundig, Technische Information*", 1972, Issue No. 1, page 974, overcomes this drawback in that the transmitting portion of such remote control device includes a key which serves to change channels as well as to switch the television receiver on and off. The "switching on" and "switching off" must here be understood to mean only that the television receiver is switched between an enabled state and its switched-on, operational, state.

The channel selection in the above-mentioned remote control device is effected by means of a single key in that every brief depression of the key causes a remote control pulse to be transmitted which in the television receiver switches a counting circuit to the next count, the counting circuit serving to control a plurality of tuning memories. If such a tuning memory is enabled it switches a preselectable tuning voltage to the variable capacitance diodes of the tuner of the television receiver.

The switching on of the television receiver from its enabled state is effected by means of the same key in that the key is actuated for a comparatively long period of time, e.g. for two seconds, and the thus produced remote control pulse is evaluated in the television receiver to actuate a switching memory. The output voltage of the switching memory itself serves to control a relay with which the circuits of the television receiver are switched on.

If the television receiver is to be switched back from its operational state to its enabled state, the one key is again depressed for a relatively long period of time so that in the television receiver the switching memory is switched over and thus the circuits of the television receiver are switched off. The known circuit has the advantage that the remote control for the program selection and for switching the operational mode of the television receiver is effected over a single remote control channel, thus requiring use of only a single frequency. However, this circuit has the drawback that the operator must be very precise with regard to the length of time he depresses the single key to perform the above-mentioned remote control functions.

SUMMARY OF THE INVENTION

It is an object of the present invention to overcome the above-mentioned drawbacks.

Another object of the invention is to further improve the ease of operation for the remote control device while requiring a minimum amount of circuitry.

These and other objects according to the present invention are achieved by a system including a remote control transmitter device provided with a plurality of channel selector keys, each for a channel to be selected, actuation of a selector key causing the emission of a remote control signal which is pulse modulated with a number of pulses corresponding to the number of the selected channel. The system also includes a memory circuit connected in the RF receiver to be enabled by the remote control receiver portion. The memory circuit includes a counter circuit for counting the pulses of one remote control signal and a memory location for each remotely controllable channel as well as an additional memory location for the switching memory, the memory circuit being designed so that in the stationary state only one of the memory locations is switched on at a time while the other memory locations remain blocked. The additional memory location is connected with the circuits of the RF receiver in such a manner that, in the switched on state, the additional memory location can switch the RF receiver into its enabled state.

BRIEF DESCRIPTION OF THE DRAWING

The single FIGURE of the drawing is a block circuit diagram of a circuit incorporating one preferred embodiment of the invention.

DESCRIPTION OF THE PREFERRED EMBODIMENTS

The FIGURE illustrates a remote control device for a television receiver whose tuning is effected in discrete steps via channel selector switches or keys 20. For each channel selector key 20 of the television receiver a potentiometer is provided in tuning memory 31, the slider of the potentiometer assigning any desired tuning voltage, i.e. any desired channel, to the respective channel selector key. If one of the channel selector keys 20 is actuated, the tap of the corresponding potentiometer in tuning memory 31 is switched to the output of this tuning memory. The actuated tuning voltage is applied via line 34 to the tuning input of tuner 35 in the remotely controlled receiver.

Every channel selector key is also associated with switches (not shown) which permit setting of the desired receiving range in which the tuning voltage of the corresponding potentiometer in memory 31 is to be effective. The setting of the receiving ranges, which are also determined in the tuning memory 31, is effected via lines 33 which are connected with the control inputs I, III, IV of tuner 35 for three possible receiving ranges I, III and IV. The tuning of tuner 35 is effected via electronically controlled reactances, e.g. variable capacitance diodes.

The receiving ranges I, III and IV correspond to parts of the frequency ranges e.g. vhf and uhf.

The circuit connection between the channel selector switches 20 and the tuning memory 31 is effected via a memory circuit 18 which includes a counter 19 and memory locations 21 to 27. Each of the bit locations of counter 19 has an output associated with one of the memory locations, so that the count present in counter 19 is represented in digital form by the output voltages of the respective memory locations. The setting inputs 30 of counter 19 are connected directly with the channel selector keys 20 so that when one of the channel selector keys 20 is actuated, the associated one of memory locations 21 – 27 is directly switched on. The outputs of the memory locations of the memory circuit 18 are connected with the inputs 32 of the tuning memory 31. Thus, for example, when channel selector key 29 is actuated, an output voltage appears at the output of memory location 22. The output voltage of memory location 22 then connects the associated potentiometer in tuning memory 31 to the tuning input of tuner 35.

The memory circuit 18 is provided with six memory locations 21 to 26 for the six channel selector keys 20 of the television receiver. An additional, seventh, memory location 27 is associated with a key 28 which serves to switch the television receiver between its switched-on state and a third, enabled, state in which the receiver is actually not operating, but is continuing to supply power to remotely controlled units.

Thus, the television receiver is constructed so that it can not only be switched on and off, but can also be switched, in addition, into the above-mentioned third state which corresponds to an enabling of the television receiver for immediate switching on when it receives a certain remote control signal.

This enabled state of the television receiver is characterized in that the actual circuits of the television receiver for receiving and processing the television signals are switched off, while at least a portion of the receiving circuit for the remote control signals is operational, or able to receive. Advantageously, the electron gun of the picture tube of the television receiver is preheated in this third state so that it is possible, on the one hand, to rapidly switch on the picture and, on the other hand, to save the cathode material of the picture tube.

In the illustrated circuit, remotely controlled switching into the on state is effected by a switch 39 which can be actuated by a signal applied to its control input 38. When switch 39 is conductive the operating voltage $U_B$ at terminal 41 is present at its output 40. The circuits of the television receiver are thus provided with operating voltage, i.e. the receiver is "on". In the illustrated embodiment, the memory circuit 18 is operational in the enabled state of the television receiver. This is necessary because the memory circuit constitutes a part of the receiving circuit for the remote control signals as described below.

To switch the television receiver from its switched-off state into its enabled state, a switch is provided at the set, which is not shown. The rest state for the normal operation of the television receiver is the above-described enabled state. In order to switch the television receiver from the enabled state to the operational, switched-on state, key 28 is provided and is arranged to act on counter 19 of the memory circuit 18 in the same manner as do the channel selector keys 20, to switch on the associated memory location 27. When the memory circuit 27 is switched on, i.e. when an output voltage appears at its output, switch 39 is opened, after a temporary delay of the output voltage from the memory location 27 by delay member 37, so that the operating voltage $U_B$ is disconnected from output 40 of switch 39, the television receiver is, as a result, switched into its enabled state. For practical operation of the television receiver this means that key 28 is considered the "off" key while the actual switching off of the television receiver from the mains voltage is effected, for example, by means of a further "mains" switch equivalent to the usual "on-off" switch.

While the switching off of the above-described television receiver, i.e. the switching from the switch-on into the enabled state, is effected by means of a special key, i.e. key 28, the switching on of the television receiver, i.e. the switching from the enabled state to the switched-on state, is effected in a different way without an additional key. The memory circuit 18 is designed so that only one of the memory locations 21 through 27 can be switched on at a time. If, for example, memory location 22 has been switched on by means of key 29, all other memory locations receive blocking pulses so that then only memory location 22 is switched on. When another key is actuated, the associated memory location is switched on while the other memory locations, and thus also memory location 22, are blocked.

It can thus be seen that upon actuation of one of the channel selector keys 20, when the television receiver is in the enabled state, the corresponding memory location is switched on and the memory location 27 is switched off. As a result, switch 39 closes so that the television receiver is switched to its operational or on state and tuner 35 is tuned, via the above-mentioned memory location and the corresponding potentiometer in the tuning memory 31, to the desired channel. Thus in the described circuit there need be no special switching contact for switching the television receiver from the enabled to the switched-on state. The function of switching on the television receiver is taken over by the channel selector keys 20.

The above-described television receiver can not only be set via the channel selector keys 20 and the off switch 28, but also via a remote control device. The transmitting part 8 of the remote control device is provided with six channel selector keys 10, here provided for selecting channels 1 to 6, and three keys 9 in the form of mercury rocker switches for adjusting continuously variable parameters, such as volume, brightness and contrast, pressure on the part of keys 9 marked with "+" increasing the respective parameter value and pressure on the portion marked "–" decreasing the respective parameter value. Keys 9 do not form a part of the novel arrangement according to the invention so that neither these keys nor their receiving circuitry in the receiver will be described in detail.

Finally the transmitter 8 is provided with an off key 7. The transmitter for the ultrasonic frequency remote control signals 12 is a loudspeaker 11.

The remote control signals for the channel selection consist of a pulse modulated carrier oscillation, with the number of pulses being equal to the number of the actuated channel selector key 10 plus one. Depression of key 7 produces a single pulse.

In order to receive the above-described remote control signals, a microphone 13 is provided which is connected in series with a circuit arrangement 14 for amplifying, selecting and rectifying the remote control signals. The circuit arrangement 14 feeds a separator stage 15 which is so designed that only the first one of the received pulses from a remote control signal appears at its output 16 and all other pulses of the remote control signal appear sequentially at output 17.

The output 16 of the separator stage 15 is connected with a reset input "R" of the memory circuit 18 through which the counter 19 can be reset to provide an output signal to the memory location 27, independent of the current count of counter 19. The output 17 of the separator stage 15 is connected with the clock pulse input "T" of the memory circuit 18, which delivers pulses to be counted to the counter 19. With this connection of the separator stage 15 and the memory circuit 18 the counter 19 is switched to memory location 27 every time the first pulse of a remote control signal is received. The following pulses then continue advancing counter 19 until it reaches the number of the actuated channel selector key 10.

Thus, if in the switched-on state of the television receiver the channel selector key 5 of the transmitting device 8 has been depressed and six pulses have been sent out, the first pulse at the output of switching arrangement 14 switches counter 10 back to memory location 27. With the next five pulses the memory circuit 18 is switched to memory location 25 so that the appropriate tuning voltage reaches the tuning input of tuner 35.

If the television receiver is intially in the enabled state, i.e. not yet in the operational state, and if the television receiver is to be switched on, the operator need only depress a channel selector key 10. The memory circuit 18 is then switched to memory location 21 by the first pulse received from output 17, i.e. the memory location 27 is switched off and the television receiver is switched to the switched-on state via switch 39.

If the television receiver, however, is intially in the switched-on state and the operator wishes to switch off the television receiver, i.e. switch it into the enabled state, then he actuates the off key 7. In this case a single pulse is transmitted by the remote control signal and, as a result, the remote control unit, i.e. the memory circuit 18, effects switching to memory location 27, thus, the television receiver is switched to the enabled state and is then no longer operational.

In order to prevent the television receiver from being switched to the enabled state during a change of channel, when the memory location 27 is temporarily switched on, the delay member 37 is so dimensioned that it prevents switching of switch 39 by delaying the output voltage of memory location 27 for the above-mentioned channel change period plus a certain extra time. The delay of the output voltage of the memory location can be effected, for example, by means of a capacitor.

The thus far described block circuit diagram for a circuit for utilizing the system according to the present invention does not represent the only circuit arrangement which can be employed.

For the case where the channel selector keys 20 on the television receiver are designed as nonmechanical switching contacts, it is advantageous for the circuits for these switching contacts to be ineffective when the television receiver is in its enabled state, as determined by the output state of the further memory location 27. This prevents the television receiver from being switched on or off by accidental actuation of the keys 20, which often switch when an object approached them, for example due to unintentional movements of a person cleaning the set. Switching of the television receiver into the switched-on state is then possible only via an additional mechanical switch-on knob. The nonmechanical keys 20 are activated only after actuation of this switch-on knob. The switch-on knob may be, for example, key 28 — which is then made nonmechanical — whereby the first depression of this key 28 switches the television receiver into the enabled state and further depression of key 28 switches the television receiver into the switched-on state.

An example with details of the circuit shown in the drawing but without the part corresponding to the invention is described in the German publication "Telefunken-Sprecher" 59/72, pages 3 to 11.

It will be understood that the above description of the present invention is susceptible to various modifications, changes and adaptations, and the same are intended to be comprehended within the meaning and range of equivalents of the appended claims.

We claim:

1. In a system for the wireless remote control of an RF receiver which can be switched between a switched-off state, a switched-on, operational, state, and an enabled state, the system including a remote control device for generating remote control signals capable of switching the RF receiver from the enabled to the operational state and tuning the receiver to the desired station, a control signal processing unit associated with the receiver and composed of a switching memory producing output signals which control the operation of the RF receiver and a state control switch connected to switch the receiver between its operational state and enabled state, and a remote control signal receiver connected to deliver the remote control signals to the memory, the improvement wherein:

a. said remote control device comprises 1. a plurality of station selector members each associated with a respective station to be selected, and 2. transmitter means connected to be controlled by actuation of any one of said selector members for transmitting a remote control signal containing a number of pulses determined by the selector member which is actuated and corresponding to the selected station; and b. said switching memory comprises 1. counter means connected to said remote control signal receiver for counting the number of pulses in a received remote control signal, 2. a plurality of station selecting memory locations and a state selecting memory location, each switchable between a state in which it produces no output signal and a state in which it produces an output signal, said counter means being connected to said memory locations for causing only one of said locations to produce an output signal upon completion of the count of the number of pulses in a received remote control signal, and 3. means connecting said station selecting memory locations to the RF receiver to cause the receiver to be tuned to the selected station in response to an output signal from the corresponding station selecting memory location, and connecting said state selecting memory location to said state control switch for causing the receiver to be switched from its enabled state to its operational state when said state selecting memory location is switched into the state in which it produces no output signal.

2. An arrangement as defined in claim 1 wherein said remote control device further comprises a state selector member connected to said transmitter means, said selector member being actuatable to cause said transmitter means to transmit a remote control signal containing a number of pulses which results in the production of a count by said counter means for causing only said state selecting memory location to produce an output signal.

3. An arrangement as defined in claim 2 wherein said transmitter means is arranged to produce remote control signals in which the number of pulses resulting from actuation of said state selector member is less than that resulting from actuation of any one of said station selector members.

4. An arrangement as defined in claim 3 wherein said remote control receiver is connected to said switching memory in a manner such that upon receipt of a remote control signal, said state selecting memory location initially produces an output signal independently of the previous output signal states of said memory locations.

5. An arrangement as defined in claim 4 wherein said switching memory is provided with a reset input connected to apply pulses directly to said state selecting memory location for causing it to produce an output signal, and a clock pulse input connected to deliver pulses to the count input of said counter means, and said remote control receiver is connected to said inputs for delivering only the first pulse of a received remote control signal to said reset input and for delivering the remaining pulses of the received remote control signal to said clock pulse input.

6. An arrangement as defined in claim 5 further comprising means connected for preventing an output signal from said state selecting memory location from switching the receiver into its enabled state for a period of time which is longer than the time for which said selecting memory location is caused to initially produce an output signal during receipt of a remote control signal for tuning the receiver to a desired station.

7. An arrangement as defined in claim 1 further comprising a plurality of station selector switches located at the receiver, and wherein said switching memory is provided with a plurality of switching inputs each connected to a respective station selector switch and each associated with a respective station selecting memory location for permitting actuation of one of said station selector switches to cause an output signal to be produced by the associated station selecting memory location.

8. An arrangement as defined in claim 7 wherein said counter is connected to said switching inputs in such a manner that actuation of one of said station selector switch causes said counter to be placed in the count state corresponding to the associated memory location which is caused to produce an output signal.

9. An arrangement as defined in claim 7 wherein said station selector switches are constituted by nonmechanical switches and said switching memory includes means for preventing said station selector switches from influencing said station selecting memory locations as long as said state selecting memory location is producing an output signal.

10. An arrangement as defined in claim 9 further comprising a state selector switch located at the receiver, and wherein said switching memory is provided with a further input connecting said state selector switch to said state selecting memory location in such a manner that each actuation of said state selector switch causes said state selecting memory locaation to switch from its previously existing state to its other state.

* * * * *